Oct. 8, 1957 — L. J. SISLEY — 2,808,935
EXTRACTOR
Filed Jan. 4, 1954 — 4 Sheets-Sheet 2
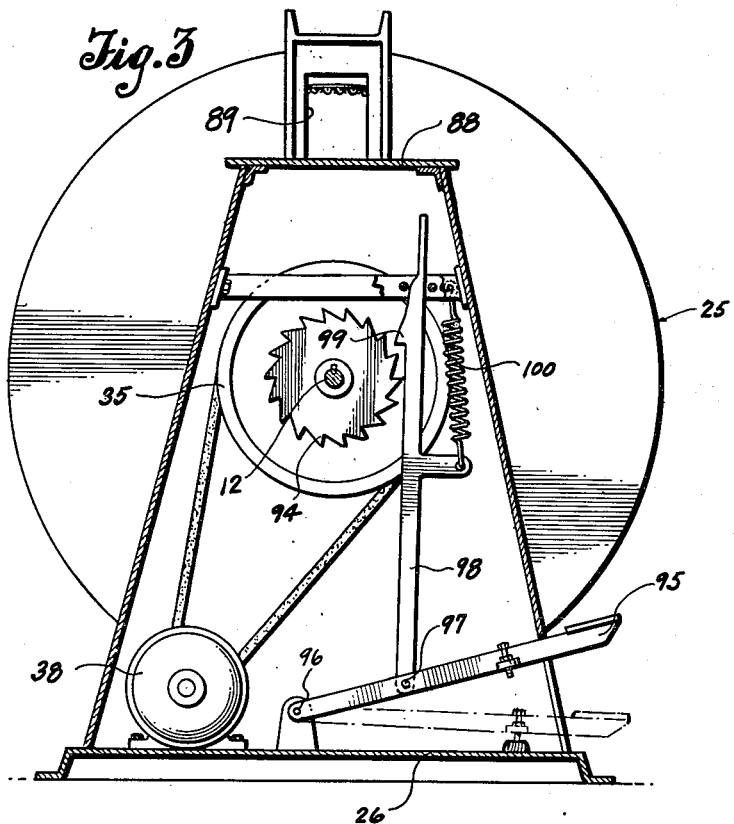
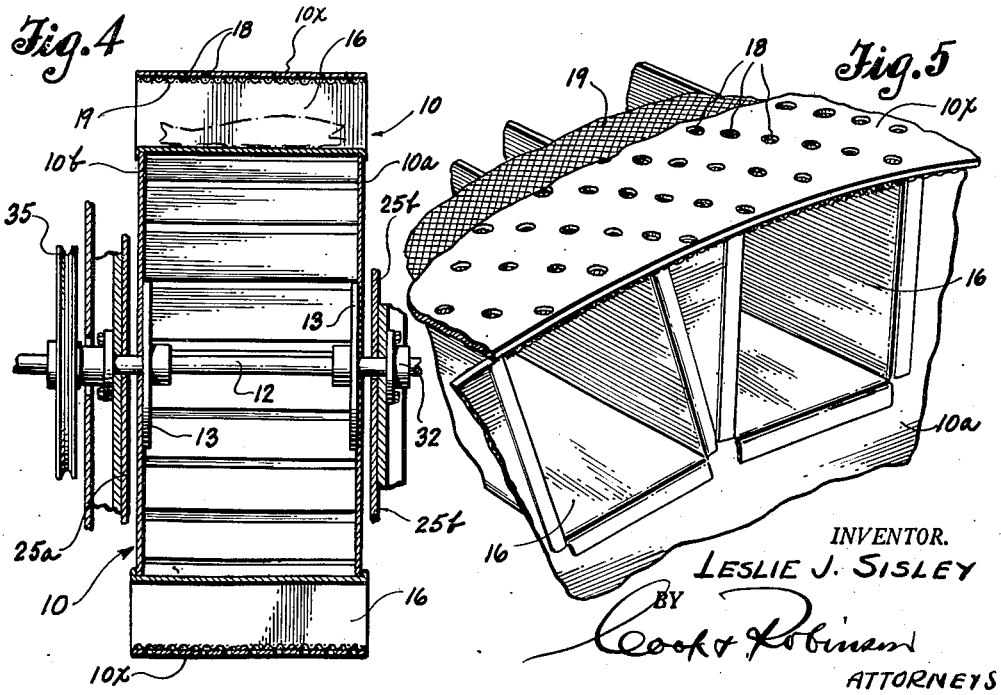
INVENTOR.
LESLIE J. SISLEY
BY Cook & Robinson
ATTORNEYS Oct. 8, 1957 L. J. SISLEY 2,808,935
EXTRACTOR
Filed Jan. 4, 1954 4 Sheets-Sheet 3
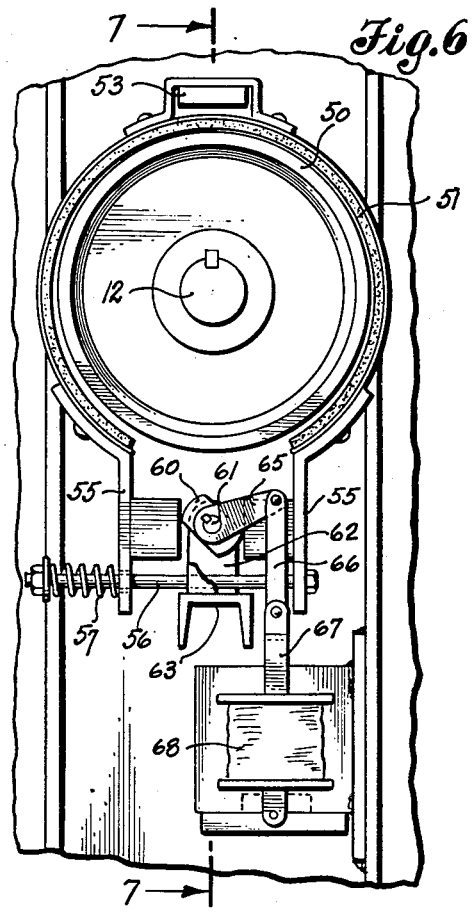
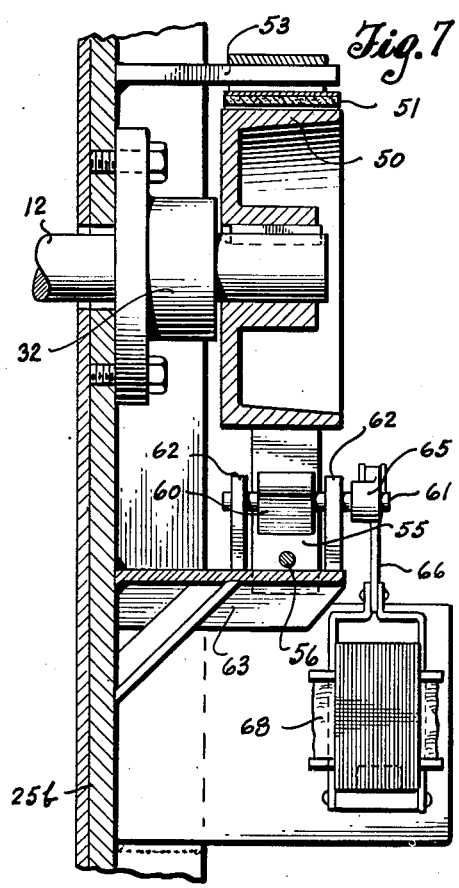
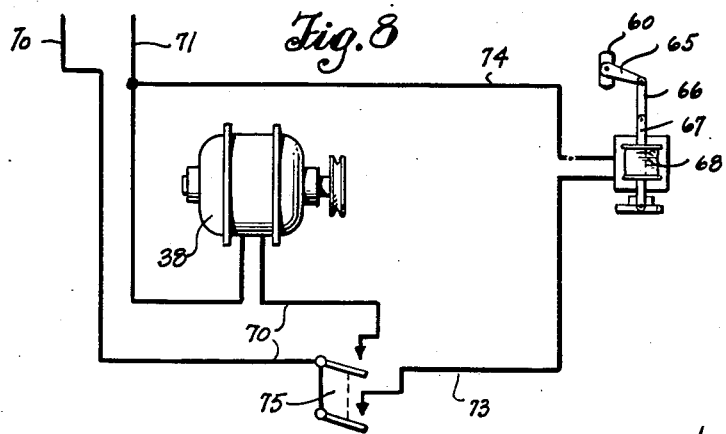
INVENTOR.
LESLIE J. SISLEY
BY Cook & Robinson
ATTORNEY Oct. 8, 1957 — L. J. SISLEY — 2,808,935
EXTRACTOR Filed Jan. 4, 1954 — 4 Sheets-Sheet 4

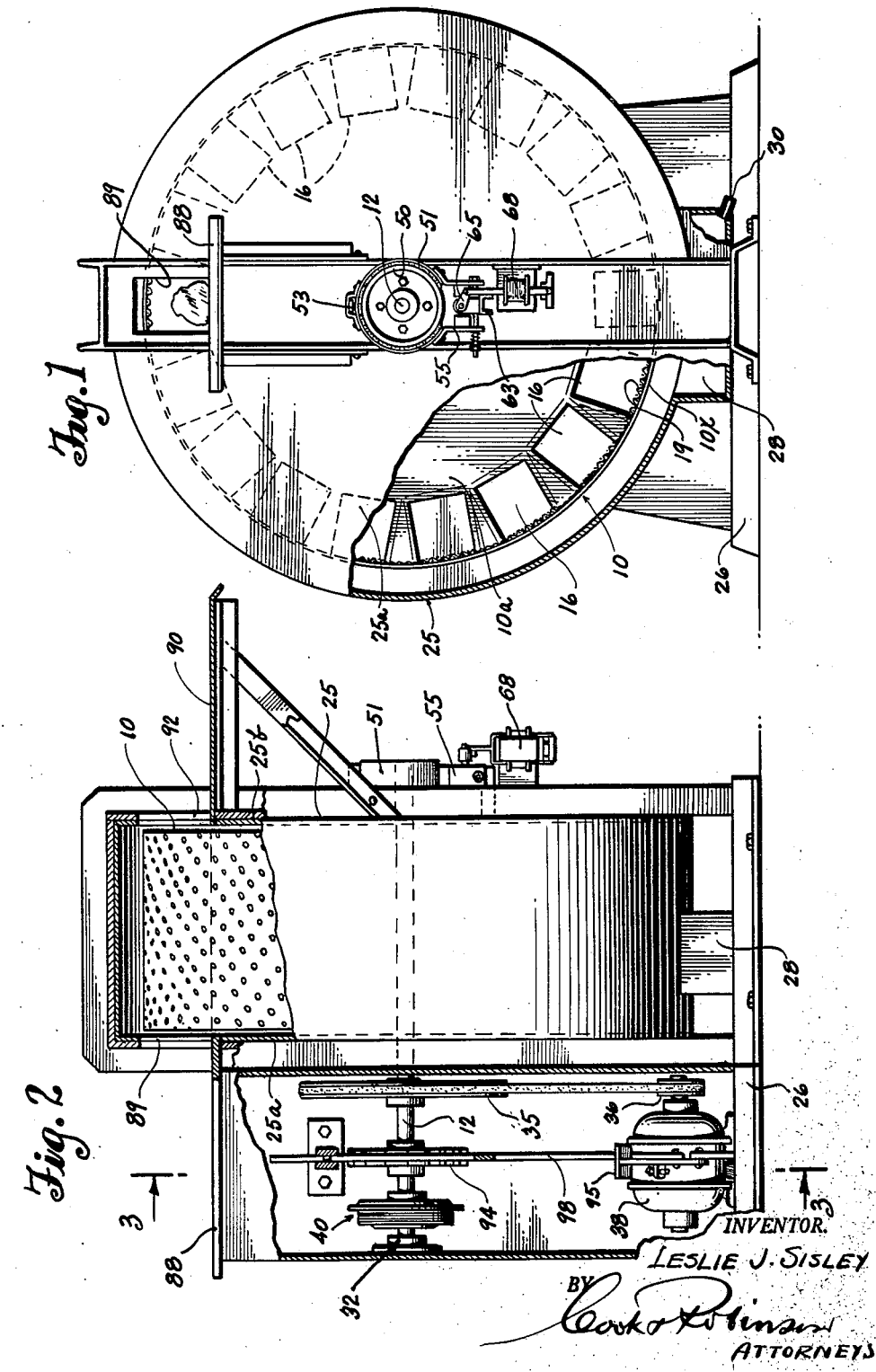

INVENTOR.
LESLIE J. SISLEY
BY
Cook & Robinson
ATTORNEYS

United States Patent Office 2,808,935
Patented Oct. 8, 1957

2,808,935

EXTRACTOR

Leslie J. Sisley, Seattle, Wash.

Application January 4, 1954, Serial No. 402,011

4 Claims. (Cl. 210—361)

This invention relates to machines for the treating of fish preparatory to use or canning. More particularly, the invention has to do with machines for the centrifugal extraction of a liquid constituent from the raw fresh fish before it is canned or stored for subsequent use; such liquid constituent, usually contained in the cell structure or tissues of the meat, being considered detrimental to the edibility of the canned product as is quite well understood in the fish canning art.

It is the principal object of this invention to provide a mechanism whereby such extraction of liquid constituent can be quickly and effectively accomplished without causing any undesirable deformation of the fish such as that which occurs when extraction is effected by direct mechanical pressure or squeezing.

More specifically stated the object of the present invention is to provide a simple, and practical extracting machine, characterized by an axially revolving drum, equipped at its periphery with pockets or compartments, each designed to contain a relatively large piece of fish, and each pocket having a perforated outer wall through which the liquid, as extracted under centrifugal force, can be thrown off; and there being means for revolving the drum as required to effect the centrifugal extraction and other means whereby the drum may be indexed to expedite the loading and unloading of the pockets.

Still further objects of the invention reside in the details of construction and combination of the various parts embodied therein and in their mode of operation, as will hereinafter be fully described.

In accomplishing the above mentioned and other objects of the invention, I have provided the improved details of construction, the preferred forms of which are illustrated in the accompanying drawings, wherein:

Fig. 1 is an end elevation of a centrifugal extracting machine embodied by the present invention; a portion of an end wall of the extractor housing being broken away for better illustration of the pocketed drum.

Fig. 2 is a side view of the machine with a portion of the housing wall broken away to show the perforated drum.

Fig. 3 is a vertical cross-section taken on the line 3—3 in Fig. 2.

Fig. 4 is a vertical cross-section, taken axially of the extracting drum.

Fig. 5 is a perspective view showing a part of the pocketed peripheral portion of the extracting drum.

Fig. 6 is a fragmental view showing the drum braking mechanism.

Fig. 7 is a cross-section of the braking mechanism taken on line 7—7 in Fig. 6.

Fig. 8 is an electrical wiring diagram for the driving motor and brake operating solenoid.

Figure 9:
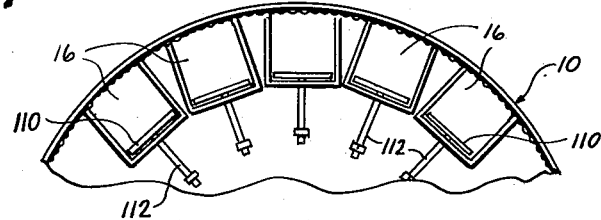
Fig. 9 is a sectional view of the pocketed portion of the extractor, showing the pockets as equipped with press plates.

Referring more in detail to the drawings:

In its present form of construction the extracting machine of this invention comprises a cylindrical drum 10 that is revolubly supported by and is fixed to a drive shaft 12. The drum, as shown best in Fig. 4, comprises a cylindrical peripheral wall 10x and it is closed at its opposite ends by the walls 10a and 10b as best seen in Fig. 4. The shaft 12 is coaxial of the drum and it has hub flanges 13—13 fixed thereto in spaced relationship and these are fixed, respectively, to the opposite end walls of the drum to mount it on the drive shaft.

Extended through the drum, at its peripheral portion, are trough-like compartments or pockets 16 which open at their opposite ends through the opposite end walls of the drum, as well shown in Fig. 4. Each pocket is of uniform rectangular cross-section, as well shown in Fig. 1, and is adapted to hold therein a piece of fish of substantial size. All pockets are of the same size and are equally angularly spaced, and all are covered by the cylindrical wall 10x of the drum. This wall is formed with a multiplicity of perforations 18, as seen in Fig. 5, through which the liquid extracted from the fish under centrifugal force when the drum is revolved can be dissipated. The wall 10x, however, as seen in Figs. 4 and 5, is underlaid with a fine mesh screen 19 that keeps the fish from being pressed tightly against perforated wall and thus closing the perforations.

The drum 10 is contained for rotation coaxially within an enclosing housing 25; this being fixedly mounted upon a base structure 26. The housing 25 is of slightly greater diameter than drum 10 as shown in Fig. 1. Extracted liquid centrifugally discharged from the perforated wall of the drum is caught in and drained from the housing into a catch basin 28 and can be drawn off therefrom as may be required, through an outlet as shown at 30 in Fig. 1.

The drive shaft 12 for supporting and driving the drum 10 extends through the opposite end walls 25a and 25b of housing and is revolubly contained at its opposite end in bearings 32—32 fixed to the housing as shown in Figs. 2 and 4.

To revolubly drive the drum, the shaft 12 is equipped with a V-belt pulley 35; this being aligned with a small pulley wheel 36 on the drive shaft of an electric motor 38; this motor being fixed on the base structure 26.

In order to compensate for any unbalanced condition due to unequal loading of the drum pockets, that would cause detrimental vibration, the drive shaft 12 is equipped with a vibration dampener; this being designated in its entirety in Fig. 2 by reference numeral 40. Preferably it is one of the same general type as those used in present day automobile engines to maintain balanced operation of the crank shaft.

To effect quick stopping of the revolving drum, when the electric circuit to the motor is opened, I equip the same with a brake mechanism as shown in Figs. 6 and 7. This brake mechanism comprises a drum 50 that is fixed on shaft 12 and a split brake band 51 applied about the drum. The band is fixedly supported midway of its ends by a bracket 53 that is rigidly fixed to the adjacent end wall of the housing 25 and is held against rotation thereby. The opposite ends of the band are equipped with the band adjusting arms 55—55, extended therefrom in parallel relationship, as seen in Fig. 6. A bolt 56 extends through these arms slidably at one end and mounts a coiled spring 57 thereon at that end whereby the band is continuously under a desired braking tension. Between the arms 55—55 a cam 60 is rotatably mounted by a cam supporting shaft 61. This shaft, as seen in Fig. 7, is rotatably mounted in supporting bearings 62—62 on a horizontal bracket or support 63 fixed to an end wall of housing 25. A lever arm 65 is fixed to and extends from the shaft 61 and is connected at its end by a link 66 with the armature 67 of a solenoid 68. The connection thus provided between armature and cam is such that when the armature is energized it will operate to rotate the cam to a position at which it will hold the brake band released from the drum.

The wiring diagram of Fig. 8, shows that the motor circuit comprises current supply lines 70 and 71. The solenoid has a circuit comprising the wires 70 and 74. Both circuits are simultaneously opened and closed by switch 75. By reason of these circuit connections as here shown, the closing of the switch causes the motor to be energized, thus to revolve the drum 10 for the extracting operation, and it also causes the energization of the solenoid to effect the releasing of the brake. When the motor circuit is opened by the opening of the switch, the brake is released for application under the force of the coiled spring 57 thus to stop the drum.

The loading and unloading of the drum pockets with the pieces of fish, or fillets, is expedited by the mounting of a flat table 88 on top of a part of the housing 25 at a level even with the bottom of an opening 89 formed in an end wall of housing 25 in position to register with the pockets as successively brought to the top of the housing by rotation of the drum. A similar table 90 is provided at the opposite side of the drum. Pieces of fish, usually referred to as fillets, or which may be halves or sections of the fresh raw fish, are first laid on the table 88 and passed endwise through the wall opening 89 into the drum pockets as successively brought to position, and as a pocket is charged from one end, any material in the pocket will be pushed out onto table 90 through an opening 92 in the other end wall of the housing.

For indexing the drum to successively advance the pockets as provided in the drum charging position, I have fixed a ratchet wheel 94 on shaft 12; this being equipped with the same number of teeth as there are pockets in the drum. A foot lever 95 is pivoted at one end on a support 96 fixed to base 26 and this lever is pivotally connected as at 97, to a bar or link 98 that extends upwardly past the periphery of ratchet 94 and is formed with a hook or shoulder 99 for engaging the teeth of the ratchet. A coiled spring 100 normally holds the foot lever and the link in a raised position and also urges the link away from the ratchet. However, downward actuation of the foot pedal, as to its dotted line position in Fig. 5, causes it to pull the link downwardly and to engage the hook with a tooth of the ratchet, thus to rotatably advance the drum one interval, thus to advance one pocket from loading position and bring the next pocket into position for loading. The drum, in this instance, is turned against drag of the brake and the indexing can be accurately effected.

Figure 10:
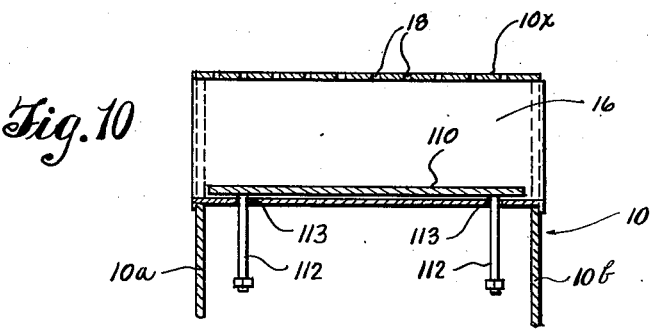
Fig. 10 is a longitudinal section of one of the pockets as equipped with the press plate.

In some instances it is desirable to obtain additional extracting effect by mechanical pressure, and in such cases, I dispose pressing plates 110 within the pockets as has been illustrated in Figs. 9 and 10. Each plate 110 is substantially flat and will lie against the bottom of the containing pocket when the pocket is in charging position. Also, it is equipped at its ends with guide bolts 112 that slide freely in holes 113 in the bottom of the pocket. When a pocket is charged with a piece of fish, the fish lies on the plate. Then under the centrifugal action produced by the revolving drum, the plates will exert mechanical pressure against the fish to give the additional desired or required extracting force.

The pockets of a machine of this kind can be easily and quickly charged. The energization of the motor results in revolving the drum at a rate at which the liquid content of the fish is caused to be centrifugally discharged or extracted therefrom. This liquid is dissipated through the perforated wall of the drum and is drained into the catch basin.

Extraction can be continued until the liquid has been extracted to a desired degree.

The present extractor avoids the mashing or deforming of the meat to any detrimental extent and leaves it in a condition that is quite unlike meat that has been subjected to squeezing pressure as in a press.

The machine is relatively inexpensive, effective, and easy to operate.

Having thus described my invention, what I claim as new therein and desire to secure by Letters Patent is:

1. An extractor of the character described comprising a cylindrical drum having a perforated surrounding wall, a stationary housing surrounding the drum, means supporting the drum in the housing for its rotation about a horizontal axial line; said drum having a succession of pockets formed horizontally therethrough adjacent said perforated surrounding wall and closed at their outer sides by said perforated wall and having their opposite ends open, and said housing having aligned openings in its opposite sides with which the open ends of said pockets are adapted to be successively registered for charging them with material for extraction and for its unloading after extraction, and means for rotatably driving said drum at an extracting speed.

2. An extractor of the character described comprising a cylindrical drum having a perforated surrounding wall, a stationary housing surrounding the drum with clearance for its rotation therein, a drive shaft extended horizontally through the housing and mounting the drum coaxially thereon, means for driving the shaft to rotate the drum at extracting speed; said drum having pockets formed horizontally there through, and closed at their outer sides by said perforated wall and open at their opposite ends, and said housing having aligned openings in its opposite sidewalls with which said open ends of the pockets may be successively registered for simultaneous charging and unloading and means for driving said shaft for rotating the shaft to rotate the drum at an extracting speed.

3. An extractor as recited in claim 2 wherein a manual means is provided for an intermittent rotative advancement of said shaft to register the pockets successively with the charging and unloading openings of the housing.

4. In a centrifugal extractor as recited in claim 2 wherein press plates are contained in the pockets for the placing of material thereon and are yieldable in an outward direction, and whereby pressure will be exerted against the material placed thereon under the centrifugal action produced by the revolving drum.

References Cited in the file of this patent

UNITED STATES PATENTS

| 987,745 | Reynolds | Mar. 28, 1911 |
|---|---|---|
| 1,273,286 | Somerford | July 23, 1918 |
| 1,403,767 | Goff | Jan. 17, 1922 |
| 2,235,988 | Frohwitter | Mar. 25, 1941 |
| 2,609,100 | Vitale | Sept. 2, 1952 |

FOREIGN PATENTS

| 8,585 | Great Britain | 1912 |